United States Patent

Feltz

[11] Patent Number: 6,145,755
[45] Date of Patent: Nov. 14, 2000

[54] SUPPLEMENTAL IRRIGATION PROGRAMMER

[76] Inventor: Louis V. Feltz, 1106 San Rafel, NE., Albuquerque, N. Mex. 87122

[21] Appl. No.: 09/413,719

[22] Filed: Oct. 5, 1999

Related U.S. Application Data
[60] Provisional application No. 60/145,388, Jul. 23, 1999.

[51] Int. Cl.[7] .............................. B05B 17/00; A01G 27/00
[52] U.S. Cl. .................................... 239/1; 239/69; 239/70; 239/99; 239/DIG. 15; 137/78.1; 137/78.5; 137/624.11; 700/284; 47/48.5
[58] Field of Search .................................... 239/1, 63, 64, 239/67, 69, 70, 99, 551, 562, DIG. 15; 137/78.1, 78.2, 78.5, 624.11, 624.18, 624.2; 700/11, 284; 47/48.5

[56] References Cited

U.S. PATENT DOCUMENTS

| 4,333,490 | 6/1982 | Enter, Sr. ......................... 137/624.11 X |
| 4,502,288 | 3/1985 | Lynch ..................................... 239/63 X |
| 5,696,671 | 12/1997 | Oliver ................................... 239/69 X |
| 5,853,122 | 12/1998 | Caprio . | |
| 6,036,104 | 3/2000 | Shih ..................................... 47/48.5 X |

*Primary Examiner*—Andres Kashnikow
*Assistant Examiner*—Steven J. Ganey
*Attorney, Agent, or Firm*—Joseph Barrera

[57] ABSTRACT

An irrigation system that controls the amount of water to be applied based upon specific historical meteorological data including relative humidity, evapotranspiration data, and precipitation. The invention is also of a method for determining the optimal time of day to measure actual relative humidity, and for setting the relative humidity set-point.

12 Claims, 4 Drawing Sheets

SUPPLEMENTAL IRRIGATION PROGRAMMER

CROSS-REFERENCE TO RELATED APPLICATIONS

This application claims the benefit of the filing of U.S. Provisional Patent Application Ser. No. 60/145,388 entitled USING RELATIVE HUMIDITY AS A CONTROL PARAMETER FOR PROGRAMMING SUPPLEMENTAL IRRIGATION, filed on Jul. 23,1999, and the specification thereof is incorporated herein by reference.

BACKGROUND OF THE INVENTION

1. Field of the Invention (Technical Field)

The present invention relates to an irrigation sprinkler control system using relative humidity ("RH") as a control parameter, and a method for determining the optimal RH set-point for comparison with the ambient RH.

2. Background of the Invention

Supplemental irrigation is used in many regions of the country to supply water for plant growth. Typically the driest periods guide the fixed quantity of supplemental water that is applied for each regularly scheduled irrigation sequence. However, intermittent periods of relatively high precipitation and high-humidity reduce or eliminate the need for supplemental watering. As a result an irrigation system that curtails supplemental watering during these periods can reduce water consumption. One such system includes a relatively expensive computer-controlled irrigation programmer that is interactively coupled to network services that provide real-time weather data. Thus, if the weather service predicts precipitation the computer will be instructed to curtail the irrigation sequence for a scheduled period. Other less expensive systems are continually sought for large numbers of lesser-volume users, for example, for home-use applications.

Supplemental irrigation programs regularly apply fixed volumes of water sufficient to meet the plant or turf requirements for the neediest stages of a given time period. For economical irrigation during this period, the applied water should be curtailed for intervals with low need. Plant watering needs are represented by a calculated parameter called evapotranspiration ("ET"). A daily ET value is generated by the service provider. This ET value considers four different weather parameters that are integrated over the 24-hour period. Daily variations of the ET value are the industry-accepted basis for planning and scheduling irrigation. Low ET values (low plant-water needs) generally coincide with interludes of high RH and low temperature. The demonstrated correlation of the daily variations of ET and RH provides the basis for using RH as an irrigation-control parameter. This correlation allows the humidistat to effect considerable water savings if properly used in the irrigation control system.

However, ambient RH is constantly changing. For high-altitude desert regions, the daily or diurnal RH variation can be more than 70%. Selecting the time of day for measuring the ambient RH and comparing that value with the irrigation control RH set-point is critical for maximizing the correlation of the RH measurement with plant water needs. Historical daily weather data is widely accessible, and daily ET data is available for nearly all regions with an agricultural base as well as for some metropolitan regions. Weather and ET data from these sources indicate general behavior patterns that are common to identifiable geographical regions.

Caprio, U.S. Pat. No. 5,853,122 is a relatively inexpensive device that uses RH as the control parameter for selectively curtailing supplemental irrigation cycles. A humidistat in the device compares the ambient RH with a pre-selected RH set-point. If the ambient RH is greater than the RH set-point irrigation will be curtailed. Conversely, if the ambient RH is less than the RH set-point irrigation, the irrigation sequence will begin. However, a major drawback of the Caprio device is that the humidistat is constantly measuring the ambient RH and controlling the irrigation system. For example, if the ambient RH rises above the RH set-point during an irrigation period, the irrigation will be halted. If such an event is repeated from day to day the initial programmed zones will receive more water than the latter programmed zones.

Another drawback to the Caprio system is that it cannot be programmed to measure ambient H and compare that value with the RH set-point at one particular time of the day, store the information as to whether or not to irrigate, and then irrigate at an alternative time of the day. Generally, it is highly advantageous to irrigate in the early morning, when loss due to evaporation is lowest. Unfortunately, in the early morning the ambient RH is generally at or near its maximum value, and, except for high arid regions, there often are extended periods with very little change from day to day in the RH, which is the control parameter. Therefore, for most regions reliance upon the daily maximum RH value does not provide a suitable control parameter. In contrast, ET data, which is a measure of actual plant needs, provides a more accurate means to determine if supplemental irrigation is needed. ET data also correlates well with the daily minimum RH values, which are generally available in the early evening, some twelve hours prior to the optimal irrigation period.

The present invention solves both of the problems encountered with the Caprio device by making the ambient RH measurement at the time of day where it shows the strongest correlation with the applied-water needs indicated by historical ET data coupled with other meteorological data. The irrigation control condition, i.e., water or don't water, is determined by the RH measurement, and remains active for the remainder of the irrigation period, usually one day. Therefore, one can measure the ambient RH and compare that value with the RH set-point at 6:00 PM and, if the condition is met, begin irrigation at 6:00 AM the next day regardless of what the ambient RH is at 6:00 AM. Also, because the present invention does not interrupt irrigation in real time, irrigation will not be halted in the middle of the programmed irrigation sequence if the ambient RH drops below the RH set-point. Therefore, all irrigation zones are given their respective amounts of water as programmed.

SUMMARY OF THE INVENTION (DISCLOSURE OF THE INVENTION)

The present invention is an apparatus for controlling the amount of irrigation water to be applied to a given area. The apparatus comprises a means to set the time and duration for one or a series of irrigation valves so water can be delivered to a given area, and a means to measure actual RH, preferably a humidistat that allows one to pre-select a RH value and compare that value to the actual measured RH to determine if irrigation water should be applied. The apparatus also comprises a means to set the optimal time at which actual RH is measured, and a means to set a time differential between the time the actual RH is measured and the time of initiating a programmed irrigation sequence. Preferably the time differential is determined and controlled by a time-delay circuit or by at least one irrigation station of an irrigation programmer. An electrical relay opens or closes a switch, according to the information obtained by the humidistat. If the actual measured RH is greater than the pre-selected RH value, then the switch will remain open, and irrigation will be precluded.

The present invention also comprises a method for controlling the amount of irrigation water to be applied to a given area. The method comprises: setting the time and duration for at least one irrigation valve so that water can be delivered to the given area, measuring and setting the optimal time at which actual RH is measured, setting a pre-selected RH value and comparing that value to the measured RH to determine if irrigation water should be applied, setting a time differential between the time the actual RH is measured and the time of initiating the irrigation sequence, and preventing irrigation if the actual measured RH is greater than the pre-selected RH value.

The present invention also comprises a method for determining the optimal time to measure RH such that the measured RH best correlates with the water needs of the crop of interest. The method comprises: graphing the daily maximum and minimum RH data, the daily precipitation data, and the daily ET data on a single graph for a given time period, comparing the maximum and minimum RH data with the ET curve to determine which RH data best correlates with the ET data, and selecting the time at which the maximum or minimum RH data was taken that best correlates with the ET data.

From the meteorological data used in the method above one can also determine the optimal value to set the RH set-point. One first determines the appropriate volume of water to be required on an average daily basis to correlate with periods of high daily ET data. Potential water savings for the period sum the total amount of water applied by irrigation and natural precipitation and subtract the total amount of water lost due to ET for the same period. This number, which represents the amount of excess water applied to the given area, is then divided by the amount of water required on an average daily basis to determine the number of days that irrigation should not be applied for the given period. The RH set-point is then determined such that the number of days that irrigation should not be applied approximates the number of days that are estimated to have a RH value above the RH set-point.

A primary object of the present invention is to provide a system for economical weather-sensitive irrigation-valve control that will effectively curtail irrigation during periods of relatively high precipitation or high humidity.

A further object of the present invention is to provide irrigation-valve control by a system incorporating a humidistat that measures ambient RH at the optimal time of day as determined by historical ET and meteorological data.

A further object of the present invention is to provide a method to select the optimal RH setpoint, calculated from historical ET and meteorological data, to determine if scheduled supplemental irrigation is to be curtailed.

A further object of the present invention to provide a detailed procedure for selecting the optimum time of day for measuring the ambient RH for comparison with the calculated or preselected RH set-point.

A further object of the present invention to provide irrigation-valve control incorporating a humidistat-generated control signal that is stored for subsequent use at the time of day for which irrigation is scheduled.

A primary advantage of the present invention is that a programmer controlled irrigation system determines whether supplemental irrigation is needed by measuring ambient RH at the optimal time of day for even greater water savings.

Another advantage of the present invention is that the present invention is not limited to real-time RH measurement and control of irrigation.

Another advantage of the present invention is that it provides a system for irrigation-valve control that can be manufactured from standard commercially available components that are incorporated into existing timer-controlled irrigation systems.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (Best Modes for Carrying out the Invention)

The present invention takes into consideration both the RH history of the geographic region as well as other selected parameters to determine which RH extreme (maximum or minimum) provides the optimal parameter for economical programming of supplemental irrigation. Because the daily cyclic RH variation is generally predictable, the selection between the RH extreme values provides the optimum time of day for measuring RH for comparison with the RH set-point.

The time of day for measuring the ambient RH is based on a study of historical meteorological data. The historical meteorological data also provides the information one needs to pre-select the appropriate RH set-point. For each scheduled irrigation sequence (usually daily) the ambient RH measurement is compared with the pre-selected RH set-point, and the option of whether or not to irrigate is performed by a time delayed electrical relay with an electrical switch in the open or closed position. The switch position remains unchanged from the time that the measurement is made until the total irrigation sequence has been completed. In effect, until it is reset, this switch functions as a "gate keeper" that either permits or prevents irrigation. The present invention does not require that the opening of the irrigation valves and the timing of measuring the actual RH be concurrent. Irrigation can be delayed sometime after the ambient RH is measured. For example, RH can be measured in the early evening and irrigation can begin early the next morning.

The present invention comprises a humidistat-controlled irrigation system wherein the RH-control signal is generated at the optimum time of day indicated by historical ET data and other meteorological data. ET data is the irrigation industry-accepted means for assessing supplemental watering needs for plants. The time of day for making the RH measurement is determined manually or by a computer. The RH set-point value is then calculated manually or by computer to provide a supplementary irrigation schedule that best coincides with the fluctuating water demands as defined by the historical ET data. The RH-control signal, i.e., water or don't water, is stored by novel circuits for subsequent use at the time of day for which irrigation is scheduled.

Figure 1:
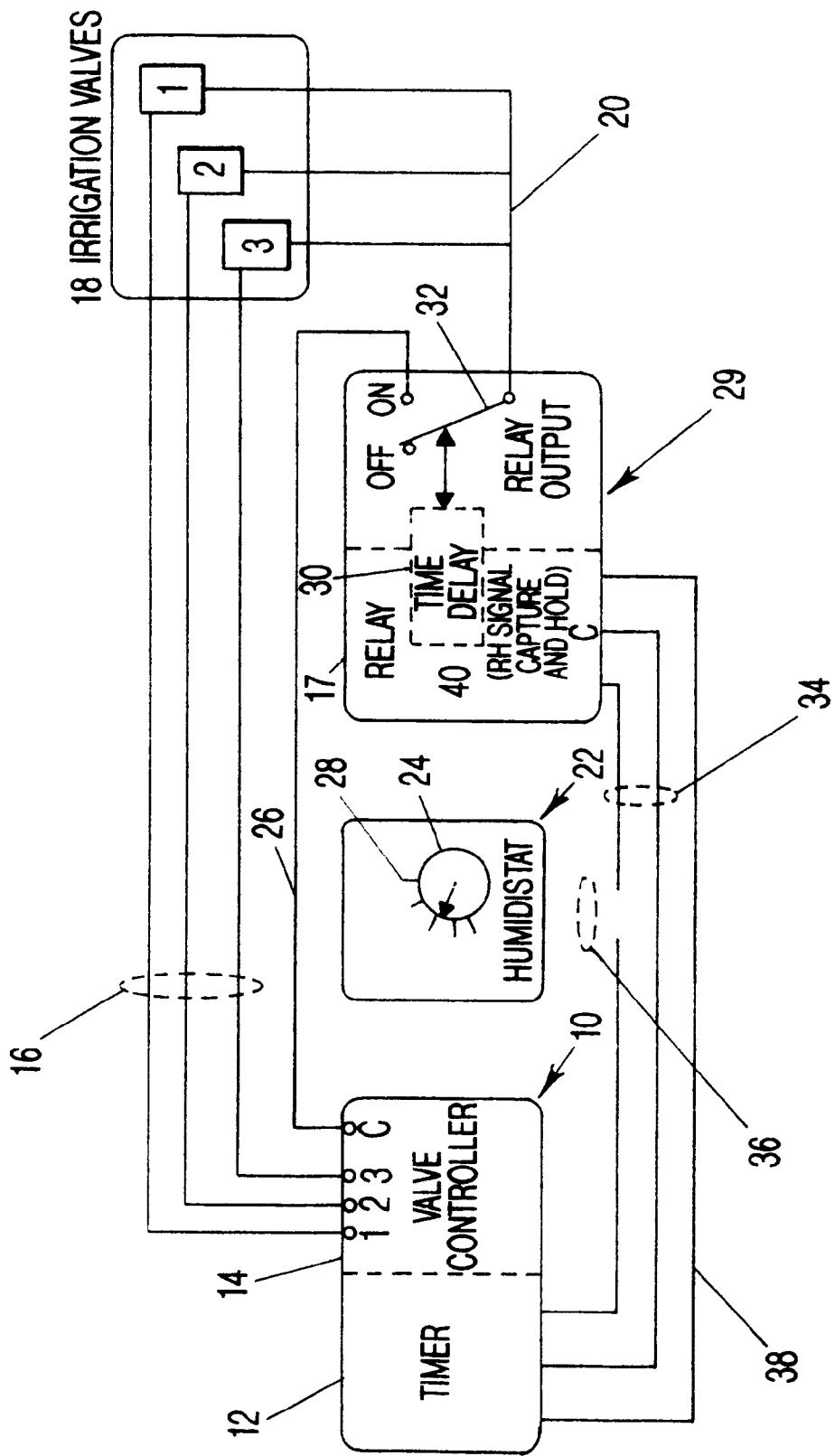
FIG. 1 represents a generic "delayed-time" irrigation circuit schematic of the invention in which an RH-control signal is measured at the optimum time of day and the signal is stored until the actual irrigation sequence is completed.

FIG. 1 is a generic block diagram illustrating how the electrical circuits and components function in the present invention. Most of the major irrigation components in the present invention are readily and commercially available. The sequence of irrigation-control in FIG. 1 is explained as follows. The irrigation programmer 10 with its timer section 12 and valve controller 14 operates the irrigation valves 18. The humidistat 22 uses the timer 12 for indicating the time of day for making the ambient RH measurement, and compares this measurement with the pre-selected RH set-point 28. The set-point is selected by adjusting the knob 24 to the desired position on the RH set-point index 28. The instruction of whether to water or not is dictated by comparing the ambient RH with the pre-selected RH set-point.

The humidistat in FIG. 1 functions as follows. The humidistat 22 is positioned in series with a timer-generated electrical signal and the time-delay device 29. The time-delay device comprises an adjustable time-delay means 30, and a two-position switch 32 that is operated by an electrical relay 40. The two-position switch 32 is locked into a fixed condition (on or off) for the time period defined by the adjustable time delay 30. For example, if irrigation water were to be applied the time delay 30 would be set from the time the RH is measured until the completion of the final irrigation station. The timer 12 generates the timing signal for comparing the ambient RH with the RH setpoint. The timing signal passes through the humidistat wires 36 to the time-delay device 29. If the ambient RH is higher than the RH set-point, the switch within the humidistat will remain in the off (open) position and thus no electrical signal is passed to the time-delay device 29. In this event, the time-delay device 29 is not activated, and the two-position switch 32 remains in its default OFF (open) position. When the switch 32 is in the OFF switch position, all instructions from the programmer 10 for the irrigation valves 18 to operate will be ignored since the irrigation valve circuit is not completed.

If the measured ambient RH is less than the RH set-point, the signal generated by the timer passes through the closed internal switch of the humidistat 22 to the time-delay device 29 which is then activated. The adjustable time delay 30 defines the time period that the relay 40 will remain activated. Activation of this relay closes the two-position switch 32 in the ON position. In this position the electrical circuit of the irrigation-valve control line (16, 20, 26) is completed, and the valves 18 function in accordance with the control signals directed by the valve controller 14. The time delay 30 is the time period from when the ambient RH is measured to the time the total irrigation sequence is completed. Since the time delay 30 locks the two-position switch 32 in a fixed condition for the duration of the irrigation sequence, all of the irrigation valves 18 will function similarly. To deactivate the relay 40, that is, to open the switch 32, one may use a relay-reset wire 38 after completion of the irrigation sequence, or a reset function that is controlled by the time-delay device 29.

Irrigation systems based upon measuring RH are practical only if a correlation can be established between the controlled irrigation sequences and the constantly-changing applied-water needs defined by the ET data together with selected meteorological data. The method of the present invention is to combine essential data in the graphical format shown in FIG. 2. The graphed data shows fall conditions for one month of a semi-arid region (Denver) but the arrangement of the included parameters is common to all geographical regions. The selected data include the maximum and minimum daily RH extremes, the ET daily requirements, and the natural precipitation that occurs during the period defined by the study. The graph shows daily values for each of these parameters.

Figure 2:
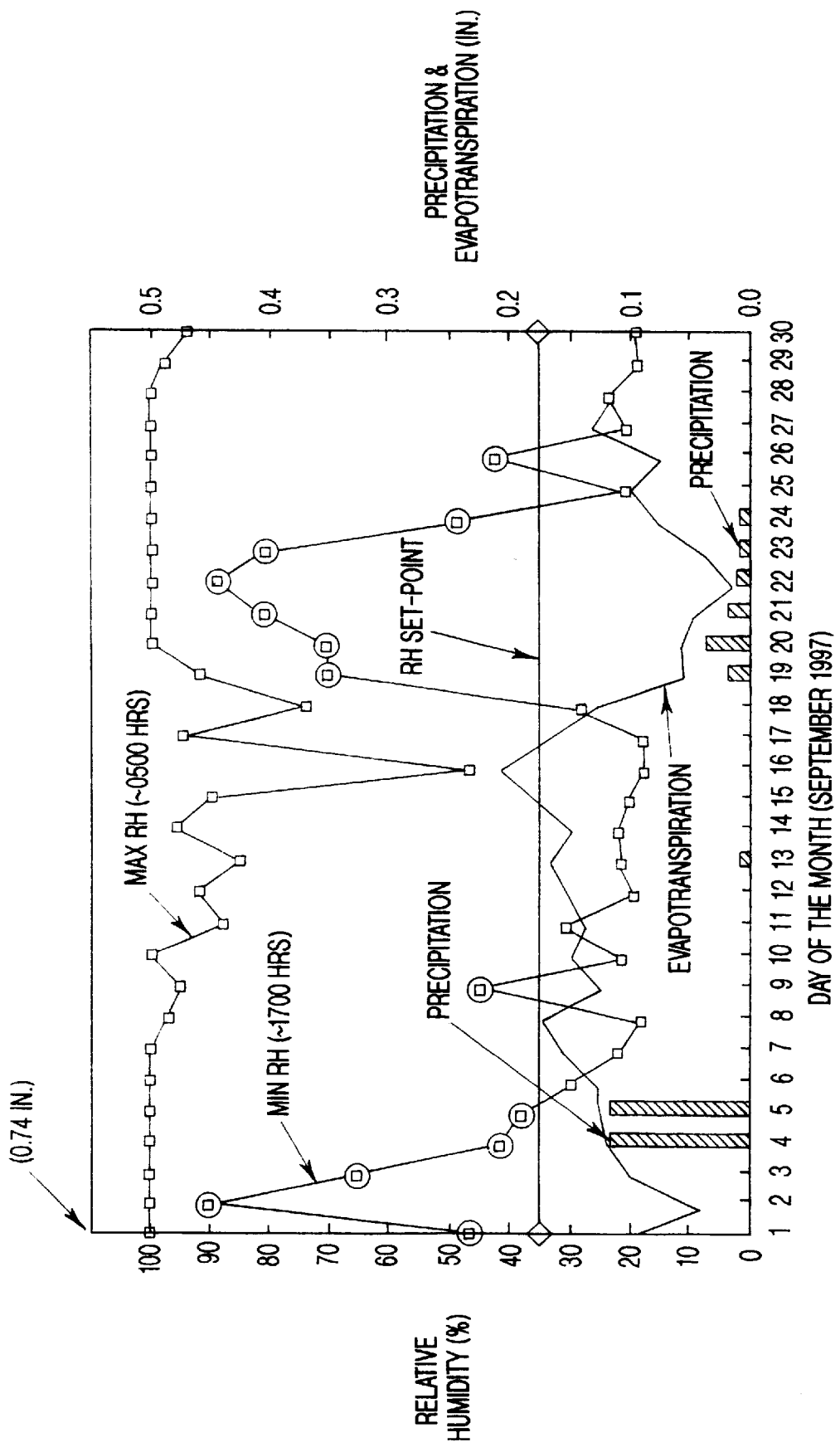
FIG. 2 is a graphical representation of meteorological and ET data combined to determine a preferred setting for the RH set-point and a preferred time of day for making the ambient RH measurement for comparison with the set-point.

The raw ET data supplied by the service provider is a parameter defined as the reference ET or potential ET. Three arithmetic modifiers adjust this raw data by considering the type of crop, e.g., turf grass, corn, cotton, etc., the acceptable crop appearance (e.g., turf) defined by a parameter known as the "stress factor," and the efficiency assumed or measured for the sprinkler coverage. The crop-type modifier usually is provided by the ET service provider, the irrigation system efficiency can be measured by empirical means or estimated, and the stress factor is user-selected from tabular data, e.g., a table that describes turf-appearance differences familiar to users. By combining these modifiers FIG. 2 represents the reference ET multiplied by 0.67 to determine the daily applied-water needs for turf grass. The turf-water needs are represented by the ET trace in FIG. 2. With reference to the ET trace, these applied-water needs are seen to vary from the dryer period high-use needs of over 0.2 inches per day to the rainy and high-humidity periods where the low-use needs drop to less than 0.05 inches per day. For irrigation programming the volume of daily applied water usually is based on the higher-use needs during the month. For the illustrated example, this value is estimated at 0.15 inches of water per day. Once the daily level of applied water is set, a water budget is created wherein the daily needs as defined by ET values constitute "withdrawals," and applied irrigation water and natural precipitation constitute "deposits." Simple arithmetic accumulations of this data for the entire month provide the approximate number of days for which irrigation can be omitted, i.e., no water days, without damage to the turf.

The ET curve is then compared with the maximum and minimum RH curves to determine which RH curve provides the best correlation with the supplemental watering needs as illustrated by the ET curve. After comparing the peaks for both the maximum and minimum RH curves with the low-ET periods it becomes obvious from visual examination that the better correlation is with the minimum RH curve. This result is usual for geographical areas that experience many days for which dew occurs. This phenomenon implies that, at least during the morning period, the RH has climbed to near 100%. FIG. 2 demonstrates that for the month of September only about eight days have a maximum RH lower than about 95%. Thus, there is insufficient variability in the maximum RH data to provide an adequate parameter for controlling irrigation. On the other hand, the minimum RH data correlates well with the low-use needs of the turf, and thus is the optimal meteorological parameter to control the irrigation system. Also, FIG. 2 demonstrates that the minimum RH data has sufficient day-to-day variability to effectively perform the irrigation-control function. The selection of minimum RH as the control parameter implies that the ambient RH measurement will be made sometime during the day when the minimum RH is available, that is, in nearly all cases between 3:00 and 7:00 PM.

The RH set-point value is selected based on the difference between the total ET needs for the entire month less the water applied by irrigation and natural precipitation. The RH set-point is represented by the heavy horizontal line plotted at the 35% RH level. In this example minimum RH is selected as the control parameter. For days that the ambient RH is above the RH set-point the normal irrigation schedule will be interrupted. In other words, the higher the set point, the fewer the days that the irrigation will be curtailed, and the less amount of water conserved. The set-point line is positioned by setting the number of no-water days to approximate the number of days with minimum RH that lie above the set-point line.

The RH set-point validation can be further assessed as follows: The first rainy period provides enough water to allow seven sequential no-water days. This is verified by accumulating the rainfall of September 1, September 4, and September 5 (approximately one inch) and accumulating the daily turf needs as defined by the ET data initiating with September 1, the first day of rainfall. The result is about seven days. The next rainy period starts on September 19 and continues through September 24. This second rainy period illustrates that copious precipitation it is not necessary for significantly reducing ET. The second rainy period is characterized by insignificant rainfall each day, but the resulting lowering of the ET curve is dramatic. This particular period is an excellent example of why minimum RH is a good parameter for controlling irrigation in the Denver region. About four additional no-water days are indicated for this second period accumulating to eleven no-water days for the month.

The technique for using maximum RH for the control parameter generally follows the same steps outlined in the previous discussion. However maximum RH as an irrigation-control parameter is effective primarily for arid, high-desert regions where dew and protracted periods of high RH are the exception. For these regions the techniques just presented are effective for determining the timing of the RH measurement as well as fixing the RH set-point. For any selected geographical region, using maximum RH as the irrigation-control parameter causes the RH set-point to be significantly higher than when using minimum RH. The selection between the two RH options is based solely on which parameter has a day-to-day variation that permits it to be used as the control parameter, and which parameter shows the best correlation with the turf needs defined by the historical ET data.

The last statement of the preceding paragraph hints that a single month of a single year from historical records does not constitute a good statistical database for fixing the irrigation parameters for that month of the current year. In fact several "normal" years of data should be used to estimate these parameters. Only one month for one location is included in the above description of the invention. The input of historical data to provide statistically refined values is not germane to the intent of the disclosure. Rather, the disclosure as stated is included to document its origin and to validate the method for selecting the time for making the RH measurement and setting the RH setpoint.

While the new procedure is configured for the purposes of this disclosure to show the ET and meteorological data in graphical form, modern information-exchange systems allow for the same data to be supplied and manipulated in digitized format. The latter format provides that computer programs can incorporate the same logic I present to model the algorithms illustrated, and which also provide the RH set-point values and optimize the timing for measuring the RH.

The invention is further illustrated by the following non-limiting examples.

EXAMPLE 1

Figure 3:
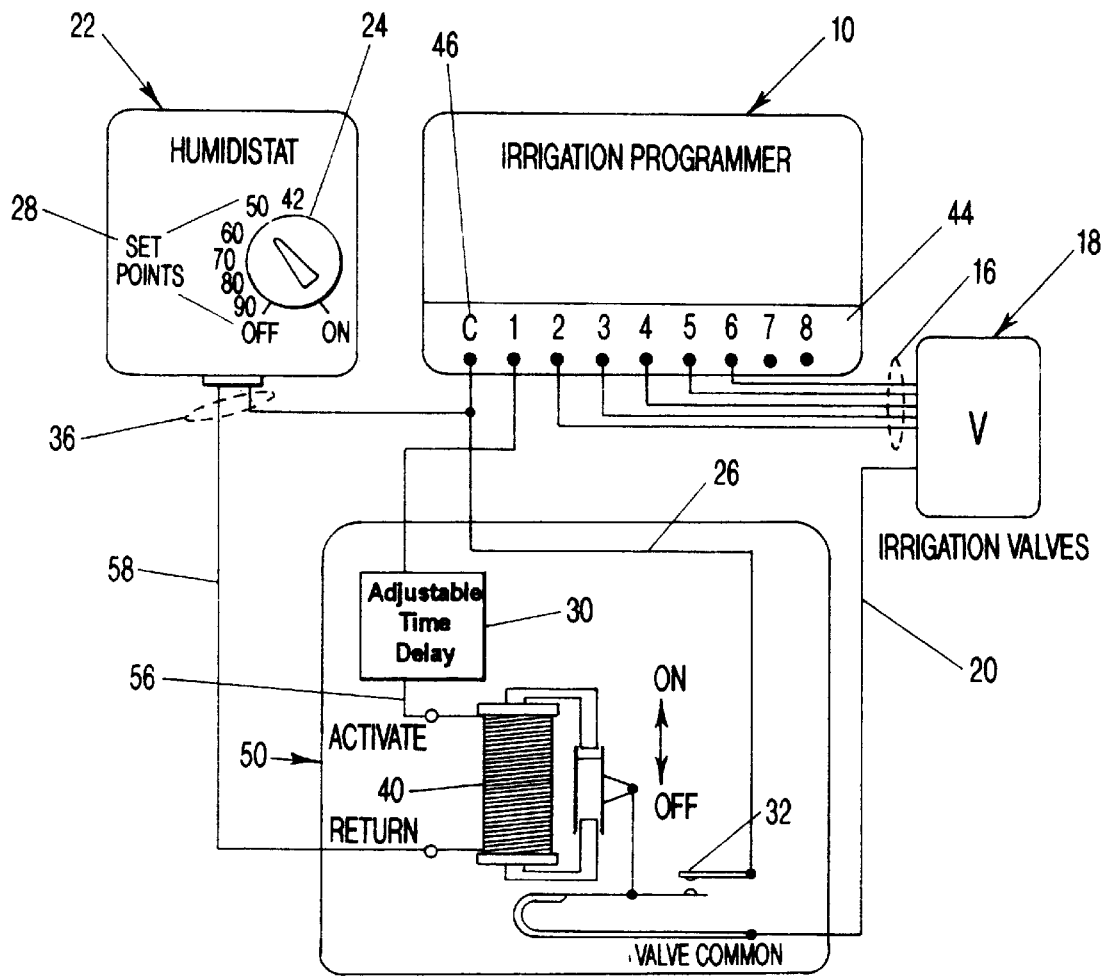
FIG. 3 presents a specific "delayed-time" irrigation circuit in conjunction with the irrigation programmer. This circuit uses a time-delay relay to effect irrigation-valve control.

FIG. 3 illustrates a time-delay device 50 comprising a relay 40 that operates a two-position switch 32. For the represented circuit, the timing signal that initiates the RH measurement is generated by the irrigation programmer 10 by irrigation station No. 1. The signal from station No. 1 passes through a control sub-circuit that includes the adjustable time delay 30, the relay 40 and to the humidistat 22 through the relay return to wire 58. If the RH measurement indicates that irrigation is required, the internal switch within the humidistat is closed and the sub-circuit is completed. The relay 40 is then activated and the two-position switch 32 is closed. The actual irrigation stations (No. 2 through No. 6) operate as the programmer directs. The irrigation-control circuit remains in this condition for the of time period defined by the adjustable time delay 30 after which time the circuit is reset back to the default condition. That is, when the preset time delay 30 expires, the relay 40 is deactivated and the irrigation circuit returns to the default condition with the two-position switch 32 in the off (open) position.

The time period set by station No.1 also controls the time at which the first actual irrigation valve, No. 2, is activated. If, for example, the RH measurement is made at 6 PM and irrigation is started at midnight the time period set into station No. 1 is six hours. This delay period is analogous to programming irrigation station No. 1 to irrigate for a period of six hours. The signal from station No. 2 begins the irrigation sequence for each of the connected irrigation valves 18. The total time from onset of the RH measurement until completion of the total irrigation sequence is the time set into the adjustable time delay 30. The programmer must have the flexibility to program the dummy station No. 1 for the time delay required between measuring the RH and the time irrigation valve No. 2 is activated. For example, if each programmer irrigation station is limited to a maximum three-hour period, two dummy stations in sequential tandem can accumulate a total delay of six hours.

If the RH measurement indicates that irrigation is not required, the internal switch in the humidistat 22 remains in the open condition, the relay 40 remains deactivated, and the switch 32 remains in the default (open) position. Likewise the time delay 30 does not receive the zero time for initiating its timing function. The irrigation-control circuit remains in the default condition until the next scheduled time for measuring the RH (usually 24 hours). The sequence is repeated at which time the humidistat 22 again evaluates whether the following irrigation sequence is to be permitted or prevented. For daily-scheduled irrigation, the RH measurements are spaced by the irrigation programmer at 24 hours, and for alternate-day programming the spacing would be 48 hours and so on.

Alternatively, the timing delay and relay functions can be operated by a separate dedicated timer in series in the sub-circuit with the humidistat. For such a circuit, the second timer is used to set the measuring time as well as initiating the time delay. If the RH measurement indicates that irrigation is required the time for the irrigation sequence is determined by the primary irrigation timer. At the completion of the irrigation sequence the time delay would then deactivate the relay. This modified circuit configuration could be used if the programmer has inadequate timing flexibility or lacks unassigned stations to provide the described non-standard programmer functions. If this modified configuration is used, irrigation-programmer valves are assigned as normal, with all irrigation programmer valve stations dedicated to irrigation valves.

Figure 4:
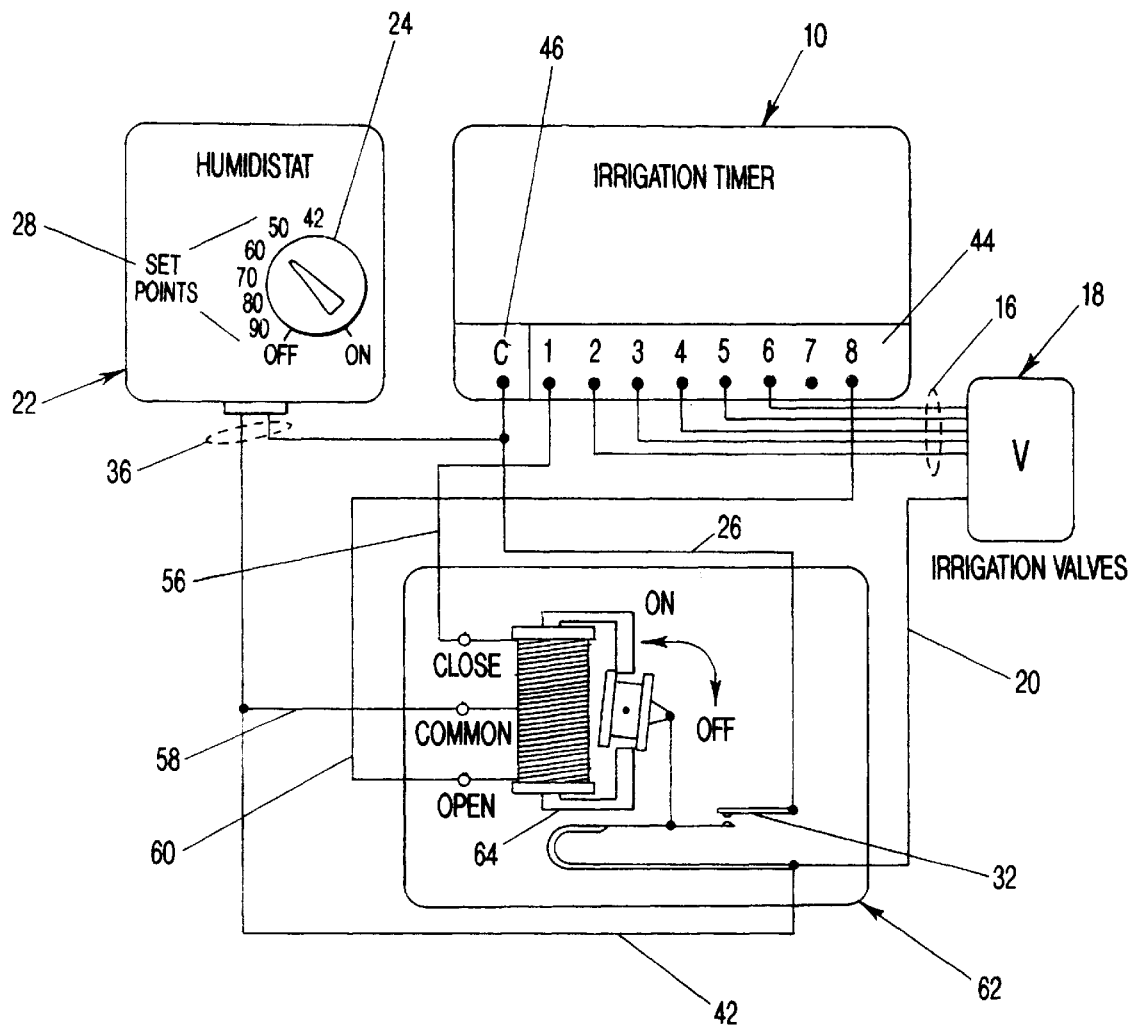
FIG. 4 presents a second specific "delayed-time" irrigation circuit in conjunction the irrigation programmer. This circuit uses a latching relay to effect irrigation-valve control.
Figure 1:
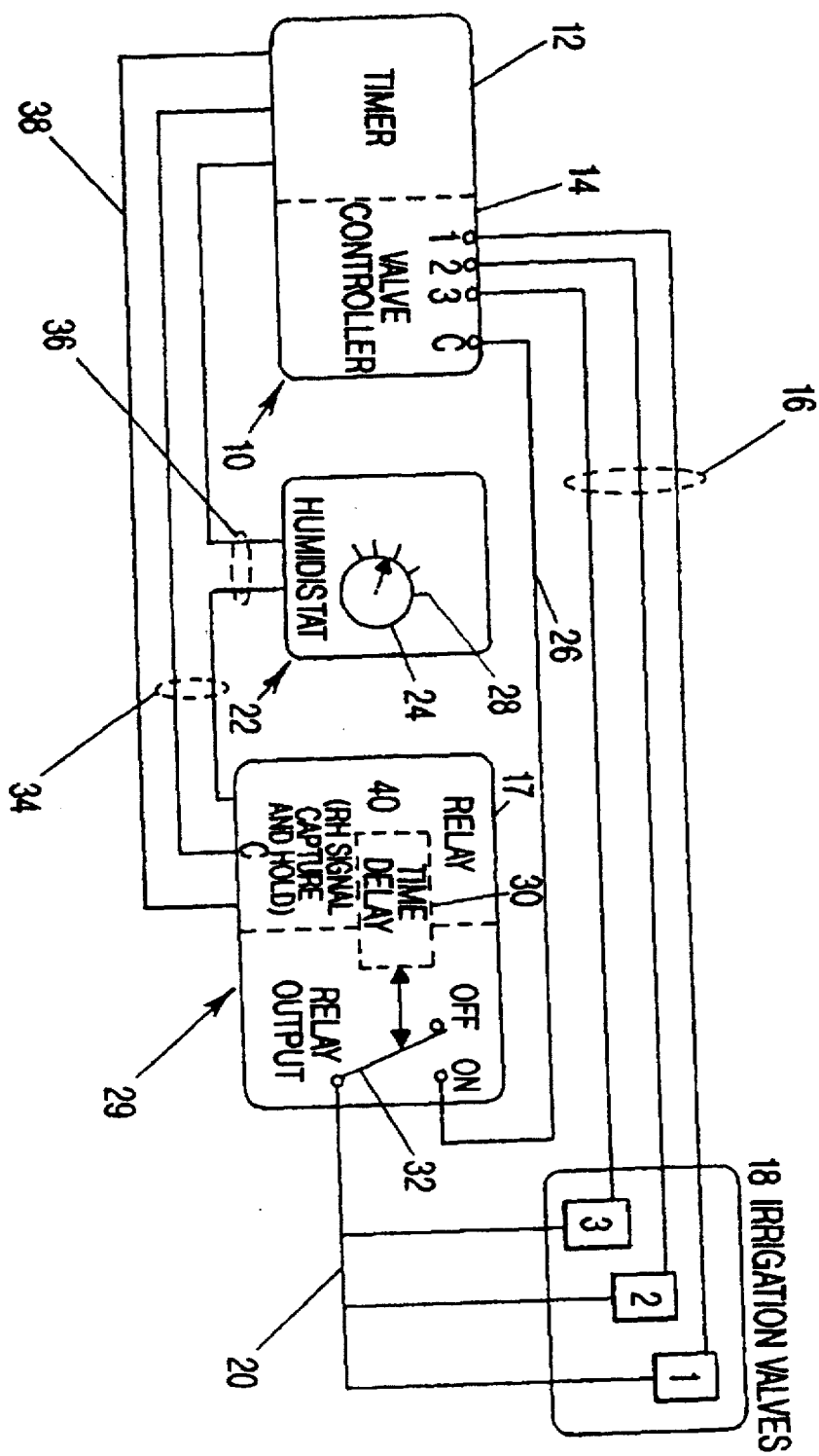
Figure 2:
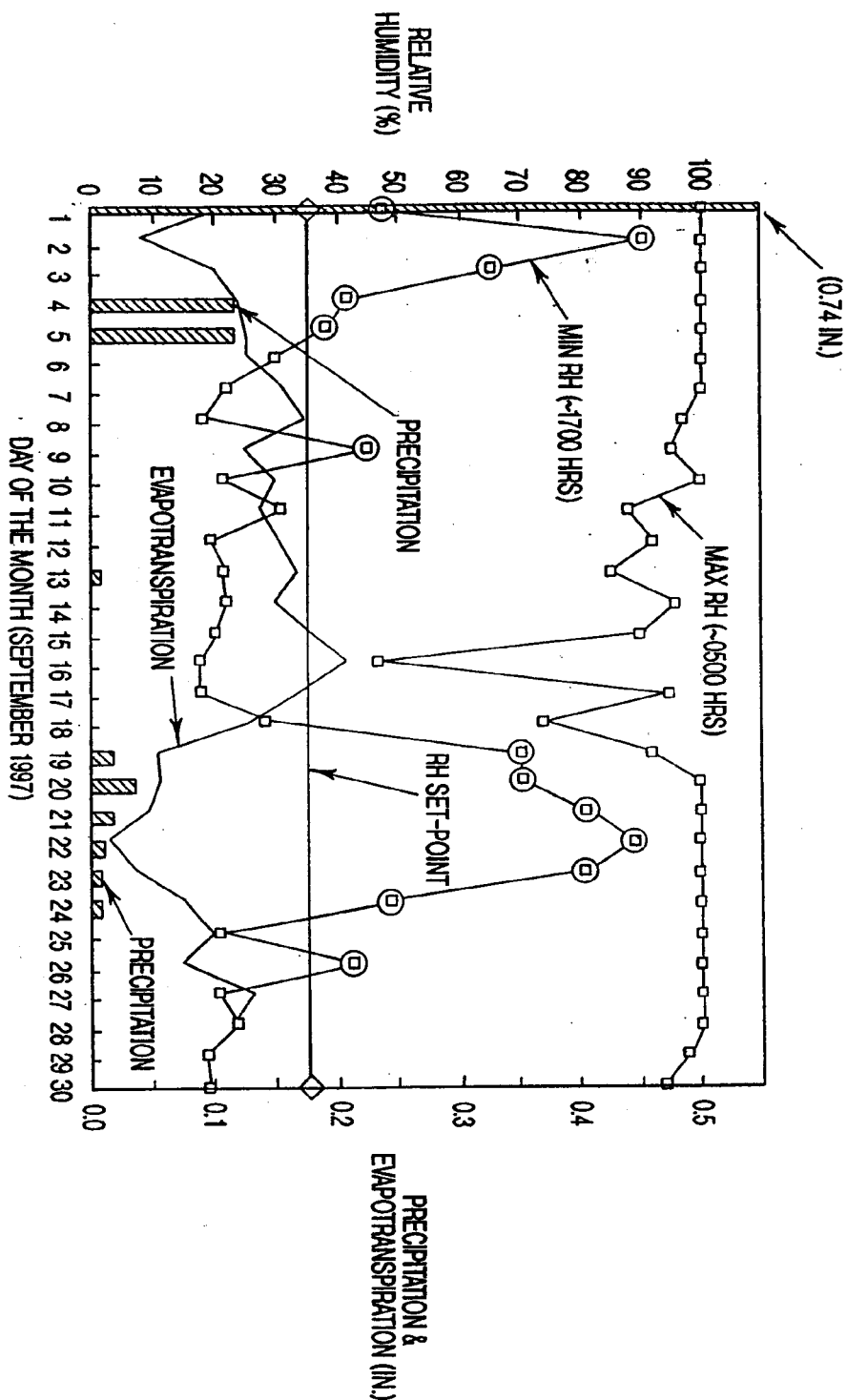
Figure 3:
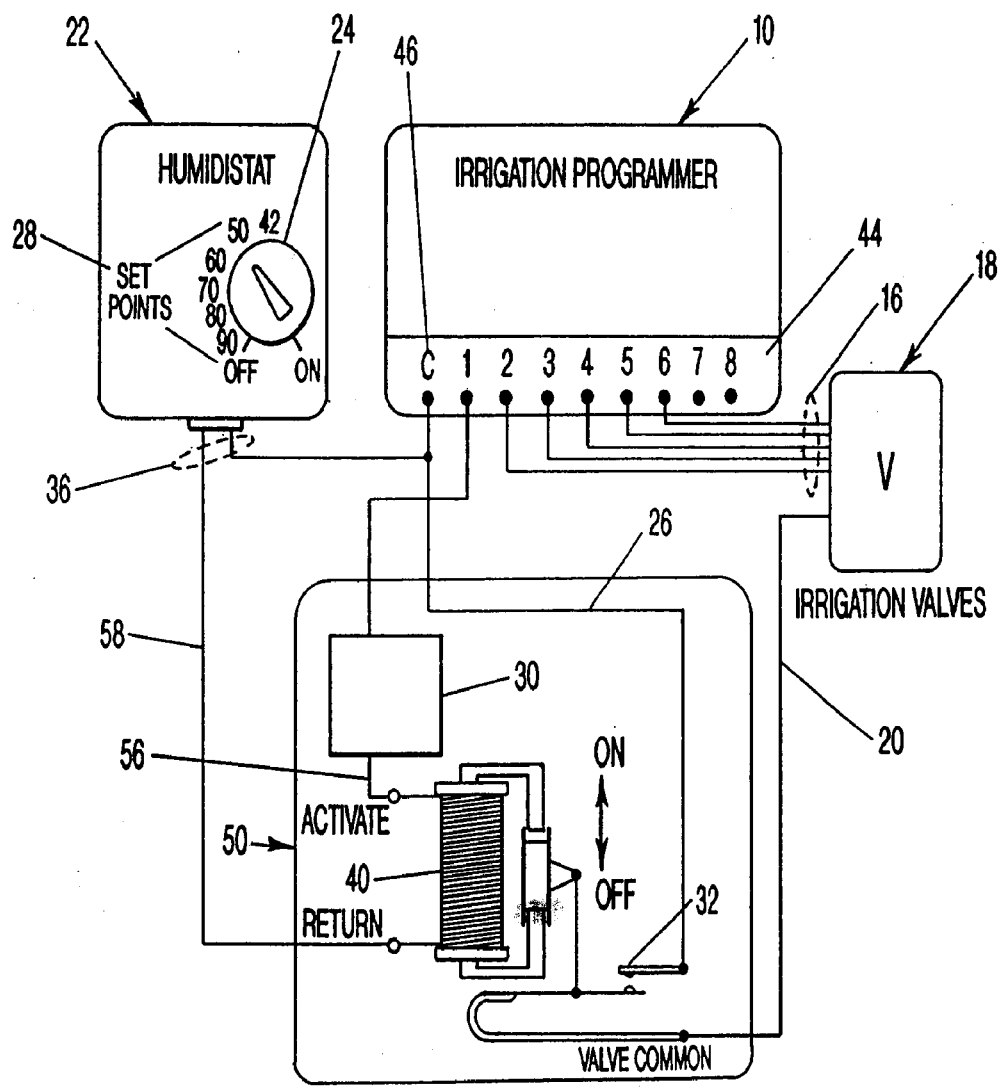

FIG. 4 illustrates an irrigation-control circuit comprising an irrigation programmer 10 with a latching relay device 62. The optimum daily time for measuring the RH is generated by the programmer 10 and passed to the humidistat 22. If irrigation is required (RH less than RH set-point) the internal switch in the humidistat is closed, thus permitting the electrical pulse generated by the programmer for station No. 1 to activate the latching relay 64. The latching relay 64, in effect, acts like a toggle switch, i.e., the switch 32 is locked in the on position until a signal is sent to deactivate the relay.

At the completion of the scheduled irrigation sequence, a "dummy" programmer station (FIG. 4 uses station No. 8) generates a signal that deactivates the latching relay 64 which resets the two-position switch 32 to its default (open) position. This signal deactivating the relay returns to the programmer through the common wire 58 from the relay to complete the circuit. The return path to the programmer common terminal is provided two options: if the humidistat switch remains closed (RH has not risen enough to open the humidistat's internal switch) the return signal can pass through the humidistat to the programmer common terminal 46 to complete the relay-control sub-circuit. Alternatively, if the humidistat's internal switch has opened since the time the RH measurement was made, a shunt wire 42 from the relay common wire 58 to the irrigation-valve side of the two-position switch 32 provides an alternate electrical return path to the programmer common terminal 46.

The addition of the shunt wire 42 to assure that the irrigation circuit is reset to its default condition introduces the remote possibility that not all of the irrigation valves function the same during a particular irrigation sequence. If the RH measurement directs that irrigation should not be allowed, the two-position switch 32 is in the open position for the duration of the irrigation sequence. However, should the ambient RH drop sufficiently such that the humidistat's internal switch closes, the irrigation-valve circuit can now be completed through the shunt wire 42, thence through humidistat wires 36 to the programmer common terminal 46 thus allowing irrigation when scheduled by the programmer. The probability of this circumstance is extremely low because for most geographical regions, the RH will be measured during the minimum-RH periods of the prior evening. If, as is common, actual irrigation is scheduled for the early morning, the ambient RH for that period will normally be significantly higher, not lower than that at the time the RH comparison is made. For the circuits detailed herein, this highly improbable scenario presents the only exception of all the irrigation valves operating similarly, and, in any event, the exception errs on the conservative side, that is extra water is applied to the turf.

The example in FIG. 4 generally will not permit irrigation if the measured RH is greater than the RH set-point 28. For this condition both the internal switch in the humidistat 22 and the two-position switch 32 remain open thus preventing the completion of the circuits to the irrigation-valves 18. Regardless of the sensed RH condition, the irrigation programmer 10 operates as always and attempts to open each sequential irrigation valve, but valve opening is prevented because of the open irrigation-valve electrical circuits. Like for the previously described device shown in FIG. 3, the programmer must have enough flexibility to provide the described timing functions. Also, as in FIG. 3, the timing functions for the humidistat and relay-control sub-circuit can be provided by a dedicated parallel timing device if the irrigation programmer capacity in inadequate.

For the device described in FIG. 4, the programmer timer 10 provides four distinct timing functions: 1) to make the RH measurement at the time of day selected by a study of the meteorological and ET data, 2) to activate the latching relay if the ambient RH is less than the RH set-point, 3) to provide the time delay from the time of the RH measurement to the first scheduled irrigation, and 4) to provide a signal at the conclusion of the irrigation sequence to deactivate the latching relay and return the irrigation-control circuit back to the default condition. In the FIG. 4 illustration, only two programmer stations are used to provide these four functions.

Each of the circuits illustrated herein can operate effectively with electrical polarity reversed from that shown. For the purposes of this disclosure, reverse polarity provides that the default condition of the irrigation-valve circuit is completed rather than open, and that the humidistat operates such that when the ambient RH is greater than the RH set-point the internal switch within the humidistat closes, the system relays are activated and the switches move from the closed to open positions.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for controlling an amount of irrigation water to be applied to a given area, said apparatus comprising:
   a) means to set time and duration for at least one irrigation valve to remain open so the amount of irrigation water can be delivered to the given area;
   b) means to measure actual relative humidity;
   c) means to set a preferred time to measure an actual relative humidity value;
   d) means to compare said actual relative humidity value to a pre-selected relative humidity value to determine if irrigation water should be applied;
   e) means to set a time differential between said preferred time said actual relative humidity is measured and said time of at least one said irrigation valve is scheduled to open; and
   f) means to prevent opening of said irrigation valve if said actual measured relative humidity is greater than said pre-selected relative humidity value.

2. The apparatus of claim 1 wherein said means to measure said actual relative humidity comprises a humidistat comprising means to pre-select said relative humidity value and compare said relative humidity value to said actual measured relative humidity.

3. The apparatus of claim 1 wherein said means to set said time differential comprises a time-delay circuit.

4. The apparatus of claim 1 wherein said means to set said time differential comprises a time delay determined by at least one irrigation station of an irrigation programmer.

5. The apparatus of claim 1 wherein said means to prevent opening of said irrigation valve comprises a switch operated by an electrical relay.

6. A method for controlling an amount of irrigation water to be applied to a given area, the method comprising the steps of:
   a) setting time and duration for at least one irrigation valve to remain open so the amount of irrigation water can be delivered to the given area;
   b) measuring actual relative humidity;
   c) setting a preferred time to measure an actual relative humidity value;
   d) setting a pre-selected relative humidity value;
   e) comparing the actual relative humidity value to the pre-selected relative humidity value to determine if irrigation water should be applied;
   f) setting a time differential between the time the actual relative humidity is measured and the time of at least one irrigation valve is scheduled to open; and
   g) preventing opening of the irrigation valve if the actual measured relative humidity is greater than the pre-selected relative humidity value.

7. The method of claim 6 wherein the step of setting the preferred time to measure the relative humidity value comprises the steps of:
   a) graphing historical daily maximum and minimum relative humidity data, daily precipitation data, and daily evapotranspiration data on a single graph for a given time period;
   b) comparing maximum and minimum relative humidity plots with evapotranspiration plot to determine which relative humidity data best correlates with the evapotranspiration data; and
   c) selecting a time at which the maximum or minimum relative humidity data was taken that best correlates with the evapotranspiration data.

8. The method of claim 6 wherein the step of setting the pre-selected relative humidity value comprises the steps of:
   a) determining the amount of irrigation water required on an average daily basis to correlate with periods of high daily evapotranspiration data;
   b) calculating total amount of irrigation water applied and natural precipitation, and total amount of water lost due to evapotranspiration for a given period;
   c) subtracting the total amount of water lost due to evapotranspiration from the total amount of water applied by irrigation and natural precipitation to arrive at an amount of water applied in excess;
   d) dividing the amount of water applied in excess by the volume of water to be required on an average daily basis to determine a number of days that irrigation should not be applied for the given period; and
   e) setting the pre-selected relative humidity value such that the number of days determined in step (d) is approximately a number of days that have a relative humidity value above the pre-selected relative humidity value.

9. The method of claim 6 wherein the step of measuring the actual relative humidity comprises a humidistat.

10. The method of claim 6 wherein the step setting the time differential comprises a time-delay circuit.

11. The method of claim 6 wherein the step setting the time differential comprises a time-delay determined by at least one irrigation station of an irrigation programmer.

12. The method of claim 6 wherein the step of preventing opening of the irrigation value comprises a switch operated by an electrical relay.

* * * * *

UNITED STATES PATENT AND TRADEMARK OFFICE
CERTIFICATE OF CORRECTION

PATENT NO.    : 6,145,755
DATED         : November 14, 2000
INVENTOR(S)   : Louis V. Feltz It is certified that error appears in the above-identified patent and that said Letters Patent is hereby corrected as shown below:

The title page shoud be deleted to appear as per attached title page.

The sheet of drawings consisting of figure 1, should be deleted to appear as per attached figure 1.

<u>Figures</u>,
In Figure 1 add parallel lines connecting element 36 to the lower circuit 38

<u>Title page</u>,
Item [76], omit "Rafel" and insert therefor -- Rafael --

<u>Column 2</u>,
Line 17, delete "H" and insert therefor -- RH --

<u>Column 8</u>,
Line 34, delete "of"

<u>Claim 7</u>,
Subsection (c), line 2, delete "was" and insert therefor -- is --

Signed and Sealed this

Twenty-second Day of January, 2002

*Attest:*

*Attesting Officer*

JAMES E. ROGAN
*Director of the United States Patent and Trademark Office*

United States Patent [19]
Feltz

[11] Patent Number: 6,145,755
[45] Date of Patent: Nov. 14, 2000

[54] SUPPLEMENTAL IRRIGATION PROGRAMMER

[76] Inventor: Louis V. Feltz, 1106 San Rafel, NE., Albuquerque, N. Mex. 87122

[21] Appl. No.: 09/413,719

[22] Filed: Oct. 5, 1999

Related U.S. Application Data

[60] Provisional application No. 60/145,388, Jul. 23, 1999.

[51] Int. Cl.7 .............................. B05B 17/00; A01G 27/00
[52] U.S. Cl. ........................ 239/1; 239/69; 239/70; 239/99; 239/DIG. 15; 137/78.1; 137/78.5; 137/624.11; 700/284; 47/48.5
[58] Field of Search .............................. 239/1, 63, 64, 239/67, 69, 70, 99, 551, 562, DIG. 15; 137/78.1, 78.2, 78.5, 624.11, 624.18, 624.2; 700/11, 284; 47/48.5

[56] References Cited

U.S. PATENT DOCUMENTS

| | | | |
|---|---|---|---|
| 4,333,490 | 6/1982 | Enter, Sr. | 137/624.11 X |
| 4,502,288 | 3/1985 | Lynch | 239/63 X |
| 5,696,671 | 12/1997 | Oliver | 239/69 X |
| 5,853,122 | 12/1998 | Caprio . | |
| 6,036,104 | 3/2000 | Shih | 47/48.5 X |

Primary Examiner—Andres Kashnikow
Assistant Examiner—Steven J. Ganey
Attorney, Agent, or Firm—Joseph Barrera

[57] ABSTRACT

An irrigation system that controls the amount of water to be applied based upon specific historical meteorological data including relative humidity, evapotranspiration data, and precipitation. The invention is also of a method for determining the optimal time of day to measure actual relative humidity, and for setting the relative humidity set-point.

12 Claims, 4 Drawing Sheets

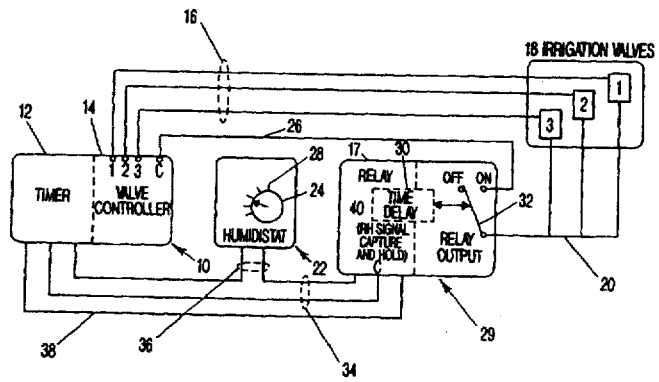

UNITED STATES PATENT AND TRADEMARK OFFICE
CERTIFICATE OF CORRECTION

PATENT NO.   : 6,145,755
DATED        : November 14, 2000
INVENTOR(S)  : Louis V. Feltz It is certified that error appears in the above-identified patent and that said Letters Patent is hereby corrected as shown below:

Drawings,
The sheets of drawings consisting of figures 2-3 should be deleted to appear as per attached figures 2-3.

Signed and Sealed this

Seventeenth Day of December, 2002

JAMES E. ROGAN
*Director of the United States Patent and Trademark Office*